Figure 1:
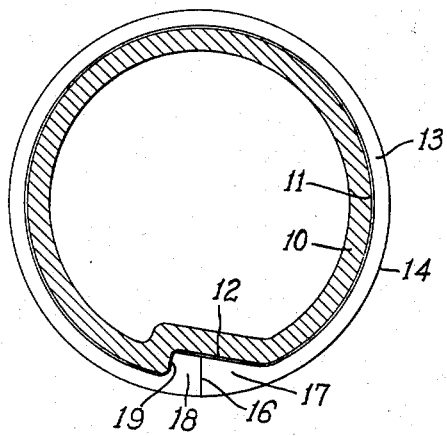

Nov. 28, 1950     A. R. MOORE     2,532,180

PISTON RING

Filed April 29, 1949

INVENTOR.
Arleigh R. Moore
BY
ATTORNEYS

Patented Nov. 28, 1950

2,532,180

UNITED STATES PATENT OFFICE 2,532,180

PISTON RING

Arleigh R. Moore, Canton, Ohio, assignor of one-half to Donald R. Minser, Hartville, Ohio Application April 29, 1949, Serial No. 90,497

2 Claims. (Cl. 309—46)

The invention relates to piston rings, and more particularly to a continuous, non-collapsible ring.

Under present practice, the ordinary piston ring is a split ring which is free to expand to contact with the inner walls of the cylinder. This continual contact between the moving piston ring and the cylinder walls has a tendency to score the walls of the cylinder as well as to wear the peripheral surface of the ring.

This also produces a considerable gap between the adjacent ends of the split ring, permitting a leakage of compression therethrough. It has been found that under pressure such rings are caused to collapse, permitting an additional loss of compression.

The present invention contemplates the provision of a piston ring which will overcome these objections by providing a solid, perfectly circular ring of pre-determined size which provides a clearance between the ring and the cylinder wall just sufficiently for the necessary oil film, without causing contact of the ring with the cylinder walls and without permitting collapsing of the ring under pressure.

Another object of the invention is to provide a piston ring which is split at one point, the ends of the ring being rigidly connected together at the split, after insertion into the piston, so as to provide a solid, completely circular ring of accurate size.

A further object is to provide such a ring in which the ends of the ring are attached together by an internal screw.

A still further object is to provide means for locking the screw in position so as to prevent opening of the ring at the split therein.

Another object is to provide a piston ring of this character having a continuous oil groove in its peripheral portion.

A further object is to provide the combination of a ring of this character with a piston having a groove, in which there is only sufficient clearance between the groove and the ring to compensate for expansion of the piston under high temperatures.

Another object is to provide a ring of this character having an inwardly offset portion at the split therein, the groove in the piston having a correspondingly shaped recess to receive this offset portion of the ring.

Figure 2:
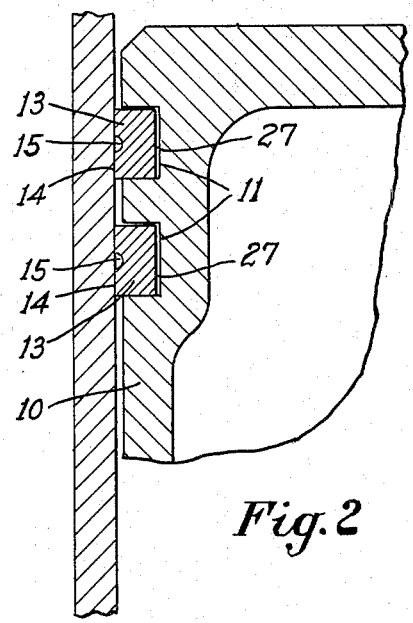
Figure 3:
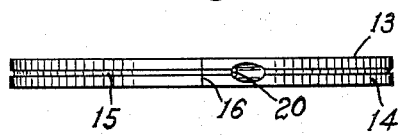
Figure 4:
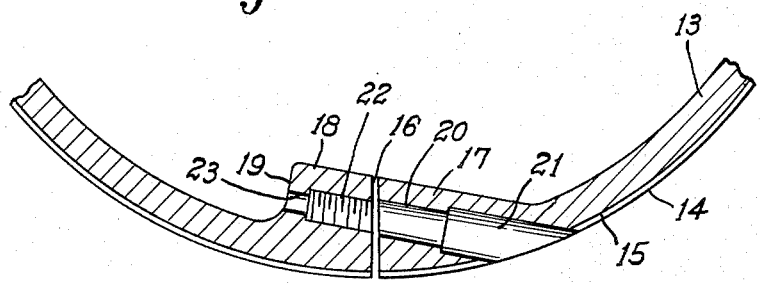
Figure 5:
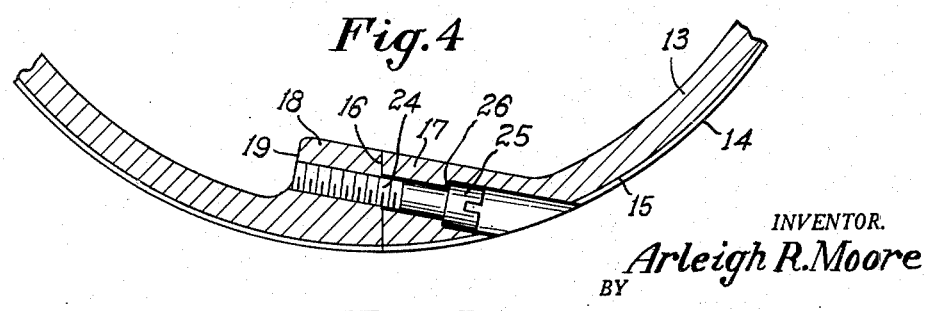

The above and other objects, apparent from the drawing and following description, may be attained, the above difficulties overcome and the advantages and results obtained, by the construction, arrangement and parts which comprise the present invention, a preferred embodiment of which, illustrative of the best mode in which applicant has contemplated applying the principle, being set forth in detail in the following description, and illustrated in the accompanying drawing, in which:

Figure 1 is a plan sectional view through a piston, showing the improved ring mounted therein;

Fig. 2 an enlarged, fragmentary, longitudinal section through a piston, showing two of the improved rings mounted therein;

Fig. 3 an edge elevation of the improved piston ring;

Fig. 4 a greatly enlarged fragmentary, sectional view of the adjacent ends of the split ring before they have been secured together; and Fig. 5 a similar view showing the ends of the ring tightly secured together by a screw.

Referring now more particularly to the embodiment illustrated in the drawing, in which similar numerals refer to similar parts throughout, a portion of a piston is indicated generally at 10, having annular grooves 11 therein to receive the piston rings, each ring groove having an angular recess 12 therein, as shown in Fig. 1, for a purpose to be later described.

The improved piston ring to which the invention pertains is indicated at 13, and the perimeter 14 thereof forms a perfect, complete circle and is preferably provided with an annular oil groove 15 which may be relatively wide so as to collect excessive chrome plating in the case of a heavily coated ring. This ring is accurately formed of such size that a .002" clearance is provided entirely around the same between the circumference of the ring and the cylinder wall.

A substantially radial split, or cut 16, is formed at one point in the ring, and the adjacent ends of the ring, on each side of this cut, are provided with the inwardly disposed, angular projections 17 and 18, the projection 17 extending inwardly at an angle from the inner perimeter of the ring and the projection 18 forming a continuation thereof and terminating in the substantially radial shoulder 19.

An angular bore 20 is formed through the projection 17, the outer end thereof being enlarged as at 21 and passing out through the circumference of the ring. An axially aligned, tapped bore 22 is formed in the projection 18, terminating through the shoulder 19 in an untapped portion 23.

In determining the outside diameter of the ring, so as to fit it for a clearance of preferably about .002" entirely around the periphery thereof between the ring and the cylinder wall, the split ends of the ring are drawn tightly together by a short screw, of a length not sufficient to reach to the untapped portion 23 of the tapped bore 22, and the same is drawn tightly up and the outside diameter of the ring is measured and if necessary the ring is dressed or buffed so that it will have exactly a .002" clearance within the cylinder wall.

This short screw is then removed and the ring is spread and slipped over the piston and into the proper groove 11 in the piston, and a longer screw, as indicated at 24 in Fig. 5, is then inserted through the bore 20 and screwed into the threaded bore 22, and the screw being of harder material than the ring, it will cut threads in the unthreaded end portion 23 of the bore which will tend to lock the screw in place.

The head 25 of the screw contacts the shoulder 26 at the inner end of the enlarged portion 21 of the bore so that as the screw is tightened the two adjacent ends of the ring are drawn tightly together. It will be seen that the projections 17—18 upon the ring will fit within the recess 12 in the groove of the piston.

In order to compensate for expansion of the piston under heat, so as to prevent the ring from sticking in the groove, the groove 11 is made slightly larger than the ring so that there will be about .002" clearance at the top or bottom of the ring, depending upon the direction in which the piston is moving, and about .015" clearance is provided between the inner perimeter of the ring and the inner wall of the groove, as indicated at 27 in Fig. 2, so that the ring is always free within the groove.

As the outside diameter of the ring is accurately determined and held to provide the slight clearance between the same and the walls of the cylinder, allowing only for a slight oil film between the ring and the cylinder, there will be little if any wear upon either the ring or the cylinder wall.

Since there is no open gap in the ring, such as is common with the usual piston ring, leakage is prevented at this point, and since the ring cannot collapse under pressure, substantially all loss of compression will be eliminated. The clearance between the inner side of the ring and the inner wall of the groove permits free movement of the ring so that it will always center itself relative to the cylinder.

Rings of this type may be made considerably wider than the conventional piston ring and where very wide rings are used, it should be understood that two screws may be used to secure the ends of the ring together instead of one screw as shown in the drawing.

Although a headed screw is shown for connecting the split ends of the ring together, a headless screw or stud may be used, in which case the ring would be prevented from collapsing under pressure although it would be free to expand.

I claim:

1. A piston ring for use in a piston having a fixed groove therein, said piston ring being in the form of a complete circle having a transverse split therein providing two abutting ends of the ring, there being an angular bore through one end portion of the ring opening out through the periphery of the ring and an angular tapped bore through the other end portion of the ring and axially aligned with the first named bore, and a screw inserted through the periphery of the ring and located through said bores for clamping the abutting ends of the ring tightly together, whereby the ring may be positioned in the fixed groove of the piston and the ends of the ring clamped together from the exterior of the piston.

2. A piston ring for use in a piston having a fixed groove therein, said piston ring being in the form of a complete circle having a split therein providing two abutting ends of the ring, inwardly disposed projections at the end portions of the ring on opposite sides of said split, there being an angular bore through one projection opening out through the periphery of the ring and an angular tapped bore through the other projection and axially aligned with the first named bore, and a screw inserted through the periphery of the ring and located through said bores for clamping the abutting ends of the ring together, whereby the ring may be positioned in the fixed groove of the piston and the ends of the ring clamped together from the exterior of the piston.

ARLEIGH R. MOORE.

REFERENCES CITED

The following references are of record in the file of this patent:

UNITED STATES PATENTS

| Number | Name | Date |
|---|---|---|
| 160,752 | Davis | Mar. 16, 1875 |
| 1,271,077 | Probasco | July 2, 1918 |
| 1,485,128 | Small | Feb. 26, 1924 |

FOREIGN PATENTS

| Number | Country | Date |
|---|---|---|
| 3,158 | Great Britain | Feb. 7, 1902 |
| 323,971 | Great Britain | Jan. 16, 1930 |